(12) United States Patent
Ghilbert-Simon et al.

(10) Patent No.: US 9,777,820 B2
(45) Date of Patent: Oct. 3, 2017

(54) CAM FOLLOWER ROLLER DEVICE

(71) Applicants: Aurelien Ghilbert-Simon, Saint Roch (FR); Benoît Hauvespre, Saint Etienne de Chigny (FR)

(72) Inventors: Aurelien Ghilbert-Simon, Saint Roch (FR); Benoît Hauvespre, Saint Etienne de Chigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/554,390

(22) Filed: Nov. 26, 2014

(65) Prior Publication Data
US 2015/0143947 A1  May 28, 2015

(30) Foreign Application Priority Data
Nov. 26, 2013 (FR) ...................... 13 61620

(51) Int. Cl.
| | |
|---|---|
| *F16H 53/06* | (2006.01) |
| *F16C 17/18* | (2006.01) |
| *F16C 33/10* | (2006.01) |
| *F16C 17/02* | (2006.01) |
| *F01L 1/14* | (2006.01) |

(52) U.S. Cl.
CPC ............. *F16H 53/06* (2013.01); *F16C 17/18* (2013.01); *F16C 33/103* (2013.01); *F16C 33/106* (2013.01); *F01L 1/14* (2013.01); *F01L 2105/02* (2013.01); *F16C 17/02* (2013.01); *F16C 2240/44* (2013.01); *F16C 2240/90* (2013.01); *F16C 2360/18* (2013.01); *Y10T 74/2107* (2015.01)

(58) Field of Classification Search
CPC .. F16C 33/103; F16C 33/106; F16C 33/1065; F16C 17/02; F16C 2240/44; F16C 2250/90; F16H 53/06; F02M 59/10; F01L 1/14; F01L 1/181; Y10T 74/2107
See application file for complete search history.

(56) References Cited

U.S. PATENT DOCUMENTS

| | | | |
|---|---|---|---|
| 3,596,533 A | | 8/1971 | Nightingale |
| 3,795,229 A | * | 3/1974 | Weber ....................... F01L 1/14 123/90.5 |
| 5,834,094 A | * | 11/1998 | Etsion ..................... F16C 33/14 277/301 |
| 2003/0128903 A1 | * | 7/2003 | Yasuda ..................... F16C 3/08 384/288 |

FOREIGN PATENT DOCUMENTS

| | | | |
|---|---|---|---|
| DE | 4228854 A1 | 3/1994 | |
| DE | 19548808 A1 * | 7/1997 | ................ F01L 1/14 |
| DE | 102007055748 A1 | 7/2008 | |

* cited by examiner

*Primary Examiner* — Thomas C Diaz
(74) *Attorney, Agent, or Firm* — Bryan Peckjian; SKF USA Inc. Patent Dept.

(57) ABSTRACT

The cam follower roller device comprises a body, a shaft mounted on the body, a roller mounted on the shaft and able to rotate, and a plain bearing interposed radially between the shaft and the roller. An outer surface and/or an inner surface of the plain bearing comprise a plurality of cavities. The ratio of the sum of the surfaces areas of the cavities to the total surface area of the outer surface, or of the inner surface, in which the cavities are formed is between 2% and 40%. The cavities have a depth between 0.5 μm and 5 μm.

5 Claims, 3 Drawing Sheets on the side of the recess 12a is intended to receive the plain bearing.

CAM FOLLOWER ROLLER DEVICE

CROSS REFERENCE TO RELATED APPLICATION

This is a National Stage application claiming the benefit of French Patent Application Number 1361620 FR filed on 26 Nov. 2013, which is incorporated herein by reference in its entirety.

TECHNICAL FIELD OF THE INVENTION

The present invention relates to the field of cam follower roller devices used in automotive or industrial applications.

SUMMARY OF THE INVENTION

One advantageous application of the invention is the use of the cam follower roller device in a fuel injection pump intended for an internal combustion engine, in particular of a motor vehicle such as an automobile or lorry.

A device such as this comprises a tappet or body and a roller mounted to rotate on the body and intended to cooperate with a cam synchronized with the camshaft of the internal combustion engine so that the rotation of the camshaft leads to a periodic displacement of a piston of the injection pump that bears against the body, to allow fuel to be delivered.

Another advantageous application of the invention is the use of the device in a rocker system intended for controlling the valves of an internal combustion piston engine.

In this application, the roller of the device is intended to cooperate, by rolling on it, with a cam of the camshaft of the internal combustion engine so that the rotation of the camshaft causes a periodic pivoting of a body of the device or of a rocker body, to open and close valves of the engine.

For these devices, a continuous oil supply for lubricating the roller and/or a shaft which supports this roller is generally provided during the operation of the internal combustion engine.

In order to reduce the costs associated with the use of such devices, it is desirable to minimize the flow of lubricating oil. Moreover, in certain applications, the cam follower roller devices must be operational even during transient periods in which the supply of oil is interrupted or in which the oil has not yet reached the zone or zones to be lubricated, for example during the start-up of the combustion engine.

The present invention aims to provide a cam follower roller device which meets these requirements.

More particularly, the present invention aims to provide a device requiring a limited supply of lubricant.

The present invention further aims to provide a device which is simple to manufacture and to assemble, is of reduced overall size and has a limited number of components.

In one embodiment, the cam follower roller device comprises a body, a shaft mounted on the body, a roller mounted on the shaft and able to rotate, and a plain bearing interposed radially between the shaft and the roller. An outer surface and/or an inner surface of the plain bearing comprise a plurality of cavities. The ratio of the sum of the surface areas of the cavities to the total surface area of the outer surface, or of the inner surface, in which the cavities are formed is between 2% and 40%. The cavities have a depth between 0.5 micrometers (μm) and 5 micrometers (μm).

Preferably, the ratio is between 5% and 15%.

The cavities may have a profile in the form of a spherical cap. The diameter of the cavities may, for example, be between 20 μm and 80 μm.

In one embodiment, the inner surface of the plain bearing is mounted radially in contact with an outer bearing surface of the shaft. Alternatively or in combination, the outer surface of the plain bearing may be mounted radially in contact with an inner surface of the roller.

In one embodiment, an outer bearing surface of the shaft for mounting the plain bearing and/or an inner surface of the roller may comprise a plurality of cavities. The ratio of the sum of the surface areas of the cavities to the total surface area of the outer bearing surface of the shaft, or of the inner surface of the roller, in which the cavities are formed may advantageously be between 2% and 40%, the cavities having a depth between 0.5 μm and 5 μm.

In one embodiment, the surface or surfaces of the plain bearing provided with the cavities is/are covered using a surface treatment which may consist of a carbon-based coating layer, such as diamond-like amorphous carbon which is known internationally under the designation DLC, or of a tungsten disulphide (WS2)-based coating layer, or else of a black oxide-type oxidation ("black oxidizing").

In one embodiment, the ends of the shaft are fixed in holes in the body. Alternatively, the device may additionally comprise a support fixed to the body and provided with open bearing surfaces supporting the ends of the shaft.

BRIEF DESCRIPTION OF THE DRAWINGS

The present invention will be better understood on reading the detailed description of embodiments given by way of non-limiting examples and illustrated by the appended drawings, in which.

DETAILED DESCRIPTION OF THE INVENTION

Figure 1:
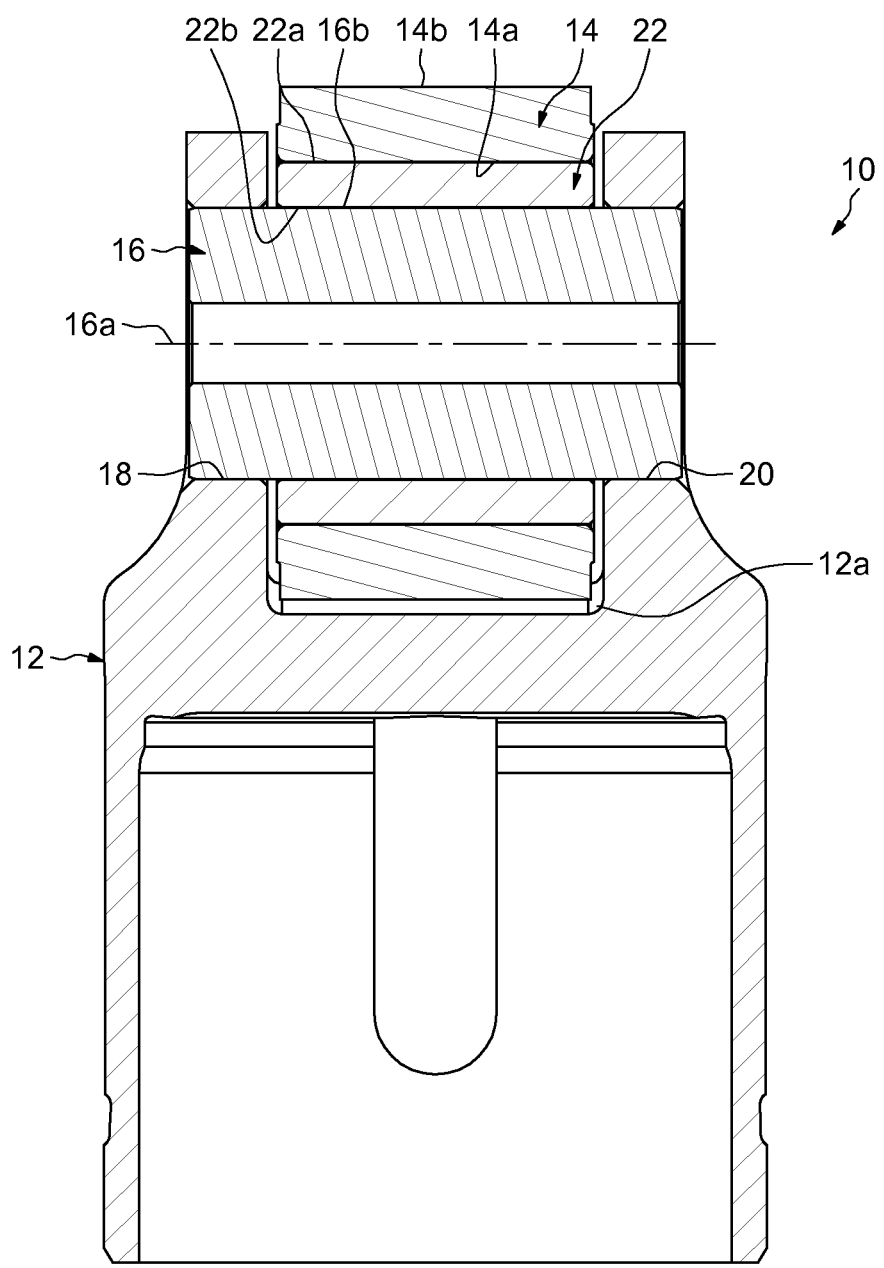
FIG. 1 is a view in section of a cam follower roller device according to a first example of the invention.

FIG. 1 shows a cam follower roller device, designated by the general reference number 10, which can for example be used in a fuel injection pump intended for an internal combustion engine.

The device 10 comprises a tappet or body 12 and a roller 14 mounted to rotate with respect to the body and intended to bear against a cam synchronized with the camshaft of the internal combustion engine or directly against a cam of the shaft. The body 12 delimits an outwardly open recess 12a inside which the roller 14 is mounted. The roller 14 extends so as to project radially outside the body 12. The body 12 may advantageously be obtained at a low cost by forging or by cutting, stamping and bending from a blank of thin metal sheet.

The device 10 also comprises a shaft 16, of geometric axis 16a, mounted on the body 12 and supporting the roller 14. The support shaft 16 comprises an axial cylindrical outer surface 16b around which the roller 14 is mounted. The shaft 16 extends axially on either side of the roller 14. The ends of the shaft 16 are mounted inside through-holes 18, 20 formed in the body 12 axially opposite one another. The shaft 16 is fixed by any suitable means to the body 12. The portion of the outer surface 16b left free by the body 12 forms an outer mounting bearing surface. The outer bearing surface is situated axially between the ends of the shaft 16 housed inside the holes 18, 20 in the body.

The roller 14 comprises an axial cylindrical bore 14a forming an inner surface, and an axial cylindrical outer surface 14b radially opposed to the bore. The outer surface 40b of the roller forms a contact surface intended to bear against the associated cam of the internal combustion engine.

The device 10 also comprises a plain bearing 22 interposed radially between the roller 14 and the shaft 16. The plain bearing 22 has an annular sleeve shape and is coaxial to the roller 14 and to the shaft 16. The bearing 22 comprises an axial cylindrical outer surface 22a mounted radially in contact against the bore 14a of the roller, and an opposed axial cylindrical bore 22b mounted radially in direct contact with the outer bearing surface of the shaft 16. The roller 14 is mounted on the shaft 16 via the bearing 22. The outer bearing surface of the shaft 16 forms a mounting bearing surface for the plain bearing 22 which supports the roller 14. The bearing 22 may be fixed to the roller 14 or to the shaft 16 or else mounted in a freely rotating manner between them. The roller 14 is mounted in a freely rotating manner with respect to the outer bearing surface of the shaft 16. In the exemplary embodiment illustrated, the roller 14 is also mounted in a freely translating manner with respect to the outer bearing surface of the shaft.

Figure 2:
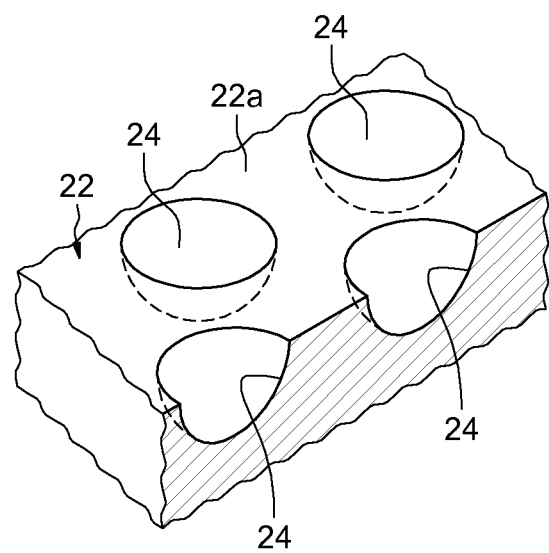
FIG. 2 is a detail view illustrating the outer surface of a plain bearing of the device of FIG. 1.

In order to be able to reduce the flow of lubricant intended for the roller 14, the shaft 16 and the plain bearing 22 while allowing operation without lubricant supply during transient periods, a plurality of cavities 24 (FIG. 2) are formed in the outer surface 22a of the bearing. The cavities 24 are formed starting from the outer surface 22a and extend radially inwards. The cavities 24 are oriented radially outwards and are open in the direction of the bore 14a of the roller. The cavities 22 form concave recesses made in the outer surface 22a of the bearing and are substantially globally identical to one another. The cavities 24 may be formed by a mechanical-impact treatment process of the shot-blasting type with balls made, for example, of steel, ceramic or else glass.

The cavities 24 are distributed over the outer surface 22a of the bearing such that the ratio of the sum of the surface areas of the walls delimiting the cavities 24 to the total surface area of the surface is between 2% and 40%. Preferably, the ratio is between 5% and 15%. Furthermore, the cavities 24 have a depth between 0.5 µm and 5 µm. In the exemplary embodiment illustrated, the cavities 24 have a profile in the form of a spherical cap. The cavities 24 may have, on the outer surface 22a of the bearing, a diameter between 20 µm and 80 µm.

Under normal lubrication conditions, the cavities 24 of the plain bearing fill with lubricant and form reservoirs which may then allow a diffusion of the lubricant contained during transient periods in which the contact zone between the roller 14 and the plain bearing 22 is no longer supplied with lubricant.

The Applicant has determined that, with a degree of coverage and a depth as are defined above for the cavities 24, it is possible to reduce the flow of lubricant to be provided under normal lubrication conditions while maintaining satisfactory operation during transient periods without lubricant supply. The risks of premature wear, of seizing and frictional energy losses are thus substantially reduced. Moreover, the frictional torque between the roller 14 and the plain bearing 22 is also reduced.

Advantageously, it is possible to additionally provide cavities in the bore 22b of the plain bearing which are formed starting from the bore and extend radially outwards. Such cavities are oriented radially inwards and are open in the direction of the outer surface 16b of the shaft. The degree of coverage defined by the ratio of the surface area of the cavities to the surface area of the bore 22b of the bearing and also the depth of the cavities are identical to those defined above for the outer surface 22a of the bearing. Thus, the flow of lubricant to be provided may again be reduced. In one variant embodiment, it could be possible to provide cavities only in the bore 22b of the plain bearing.

In another variant embodiment, it could again be possible to provide, at least in the bearing surface of the outer surface 16b of the shaft on which the plain bearing 22 is mounted, and/or in the bore 14a of the roller, a plurality of cavities intended to form lubricant reserves in an identical manner to those provided in the outer surface 22a and/or in the bore 22b of the bearing.

Figure 3:
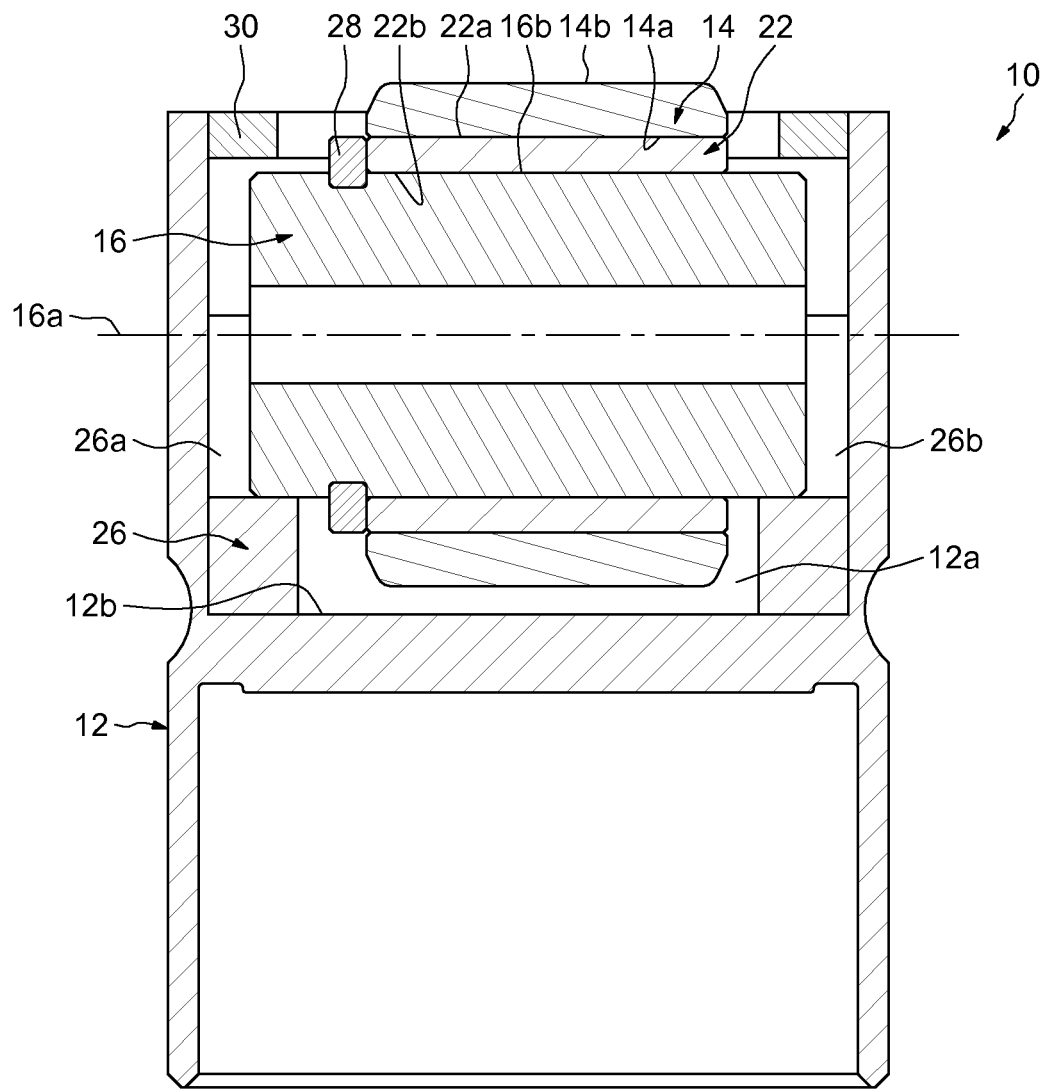
FIG. 3 is a view in section of a cam follower roller device according to a second example of the invention.

The exemplary embodiment illustrated in FIG. 3, in which identical elements bear the same references, differs from the first exemplary embodiment described principally in that the device 10 comprises a support 26 mounted axially so as to bear against a bottom wall 12b of the body and comprising bearings or bearing surfaces 26a, 26b which are open and oriented radially outwards. The support 26 is fixed to the body 12 by any suitable means. The bearing surfaces 26a, 26b have a semicircular profile open radially outwards with a diameter corresponding to the diameter of the shaft 16. The shaft 16 is mounted radially in contact against the bearing surfaces 26a, 26b of the support. A circlip 28 is fixed to the shaft 16 and bears axially against the plain bearing.

In this exemplary embodiment, the device 10 also comprises an annular retaining ring 30 fixed to the end of the body 12 in order to retain the roller 14 relative to the body during transport and assembly of the device 10. In the example illustrated, the retaining ring 30 is an add-on part fixed to the body 12. Alternatively, it could be possible to form, at the end of the body 12, one or more local deformations of material so as to prevent the roller 14 from moving out of the body 12 after assembly. In this exemplary embodiment, in an identical manner to the first exemplary embodiment, at least the outer surface 22a of the plain bearing on which the roller is mounted and/or the bore 22b of the bearing comprise cavities as defined above.

The present invention has been illustrated on the basis of a cam follower roller device which can, for example, be used in a fuel injection pump intended for an internal combustion engine. It is also possible, without departing from the scope of the invention, to provide a cam follower roller device in a rocker system which is used for controlling valves of an internal combustion engine, and which comprises a shaft, a roller and a plain bearing as defined above.

The invention claimed is:

1. A cam follower roller device, comprising:
    a body having a hollow cylindrical shape and having a bottom wall that separates an outwardly open recess from an inward recess wherein the outwardly open recess is defined by the bottom wall and an inner periphery of an outer hollow cylindrical portion of the body,
    a support nested within the inner periphery of the outer hollow cylindrical portion of the body and positioned against the bottom wall, the support comprising first and second bearing surfaces that each have a semicircular profile,
    a shaft extending within the outwardly open recess, first and second ends of the shaft being supported by the first and second bearing surfaces, respectively, such that the shaft is completely located within the inner periphery of the outer hollow cylindrical portion of the body, the shaft further comprising a recess on a shaft outer cylindrical surface, a roller mounted on the shaft and able to rotate and comprising an axial cylindrical surface and an axial cylindrical bore, and a plain bearing interposed radially between the shaft and the roller, a circlip located within the recess on the shaft outer cylindrical surface, a portion of the circlip extending outwardly away from the shaft outer cylindrical surface and being configured to axially abut against an end face of the plain bearing, wherein an outer surface and/or an inner surface of the plain bearing comprise a plurality of cavities, the ratio of the sum of the surface areas of the cavities to the total surface area of the outer surface, or of the inner surface, in which the cavities are formed being between 2% and 5%, the cavities having a depth between 0.5 µm and 5 µm.

2. The cam follower roller device according to claim 1, wherein the cavities have a profile in a form of a spherical cap.

3. The cam follower roller device according to claim 2, wherein the diameter of the cavities is between 20 µm and 80 µm.

4. The cam follower roller device according to claim 1, wherein the inner surface of the plain bearing is mounted radially in contact with the shaft outer cylindrical surface.

5. The cam follower roller device according to claim 1, wherein the outer surface of the plain bearing is mounted radially in contact with the axial cylindrical bore of the roller.

* * * * *